United States Patent [19]

Büchel et al.

[11] Patent Number: 4,523,923
[45] Date of Patent: Jun. 18, 1985

[54] SOLID DISPERSE DYE FORMULATIONS CONTAINING NON-IONIC DISPERSANTS FOR TRANSFER PRINTING INKS

[75] Inventors: Urs Büchel, Biel-Benken, Switzerland; Paul Muther, Basel, both of

[73] Assignee: Ciba-Geigy Corporation, Ardsley, N.Y.

[21] Appl. No.: 580,908

[22] Filed: Feb. 16, 1984

[30] Foreign Application Priority Data

Feb. 28, 1983 [CH] Switzerland .................. 1082/83

[51] Int. Cl.³ .................... C09B 67/38; D06P 1/16
[52] U.S. Cl. .................................... 8/524; 8/471; 8/552; 8/553; 8/602; 8/609; 8/907
[58] Field of Search .............. 8/553, 552, 609, 602, 8/524

[56] References Cited

U.S. PATENT DOCUMENTS

| | | | |
|---|---|---|---|
| 3,960,486 | 6/1976 | Danbach et al. | 8/524 |
| 4,233,026 | 11/1980 | Hitschfel et al. | 8/524 |
| 4,249,902 | 2/1981 | Kruckenberg et al. | 8/525 |
| 4,295,849 | 10/1981 | Nonn et al. | 8/524 |

FOREIGN PATENT DOCUMENTS 1467746  3/1977  United Kingdom .
1538978  1/1979  United Kingdom .

*Primary Examiner*—A. Lionel Clingman
*Attorney, Agent, or Firm*—Edward McC. Roberts; Kevin T. Mansfield

[57] ABSTRACT

The invention relates to solid disperse dye formulations which do not contain anionic dispersants and which comprise one or more disperse dyes having a particle size of less than 5 μm, and one or more nonionic dispersants selected from the group of the fatty alcohol ethoxylates having a molecular weight of 800 to 2000, of the fatty amine ethoxylates having a molecular weight of 500 to 1000, and of the polyvinylpyrrolidones having a molecular weight of 10,000 to 25,000.

These formulations are particularly suitable for preparing organic printing pastes and printing inks which contain synthetic thickeners and which are suitable for textile printing and for transfer printing.

9 Claims, No Drawings

SOLID DISPERSE DYE FORMULATIONS CONTAINING NON-IONIC DISPERSANTS FOR TRANSFER PRINTING INKS

The present invention relates to solid disperse dye formulations which do not contain anionic dispersants, to a process for the preparation thereof, and to the use of said formulations for pre-paring organic printing pastes and printing inks.

Solid powdered formulations of disperse dyes often contain anionic dispersants such as lignosulfonates or condensates of formaldehyde and aromatic sulfonic acids. The presence of these components is usually not disadvantageous when such formulations are used for preparing dyebaths, as anionic dispersants favourably influence the stability of the dye dispersion at elevated temperature. However, such dye formulations are not suitable for preparing organic printing inks or pastes which contain synthetic thickeners, because, depending on the amount of anionic dispersant added to the formulation, the viscosity of the synthetic thickener decreases rapidly until all that remains is a low-viscosity formulation which is totally unsuitable for printing.

Moreover, lignosulfonates and condensates of formaldehyde and aromatic sulfonic acids are poorly soluble in the organic solvents normally employed for preparing purely organic printing pastes and printing inks.

Accordingly, it is the object of the present invention to provide disperse dye formulations which do not contain anionic dispersants and which are particularly suitable for preparing organic printing pastes and printing inks which contain synthetic thickeners. Nonionic dispersants, such as the large number of widely available adducts of ethylene oxide and block polymers of ethylene oxide and propylene oxide, are readily compatible with synthetic thickeners. Nevertheless, the total replacement of anionic dispersants by nonionic dispersants must necessarily appear problematical, as it means not using anionic dispersants when grinding the crude disperse dye. However, it is known that, during the grinding procedure, mechanical pressure initially causes the formation of microcracks in the crystal particles of the crude dye. In order that these microcracks lead ultimately to a division of the dye particles and do not disappear again when pressure is eased, it is common practice to grind the dye in the presence of ionic dispersants. The dispersants penetrate the cracks and, owing to their equidirectional charge, diminish the mechanical energy necessary for dividing the particles [q.v. S. HEIMANN, Melliand 12, 885 (1982)]. Although nonionic dispersants also have affinity for the dye particles and penetrate the microcracks formed during the grinding procedure, they cannot so efficiently assist the process of division because they carry no charge.

However, the requirement made of the dispersants is not only that they shall be suitable grinding assistants, but also that they must be soluble in the media employed for preparing printing inks, especially in alkyd resins, in order to make possible in particular the preparation of non-aqueous printing pastes and printing inks.

Surprisingly, it has now been found that nonionic dispersants selected from the group consisting of the fatty alcohol ethoxylates having a molecular weight in the range from 800 to 2000, of the fatty amine ethoxylates having a molecular weight in the range from 500 to 1000, and of the polyvinylpyrrolidones having a molecular weight in the range from 10,000 to 25,000, meet these requirements and are suitable for use as grinding assistants and for incorporation in purely organic printing pastes and printing inks.

Accordingly, the invention provides solid disperse dye formulations which do not contain anionic dispersants and which comprise one or more disperse dyes having a particle size of less than 5 $\mu$m and one or more nonionic dispersants selected from the group of the fatty alcohol ethoxylates having a molecular weight in the range from 800 to 2000, of the fatty amine ethoxylates having a molecular weight in the range from 500 to 1000, and of the polyvinylpyrrolidones having a molecular weight in the range from 10,000 to 25,000.

Suitable dyes for the preparation of the formulations of this invention are disperse dyes belonging to the widest range of dyestuff classes, in particular dyes of the azo and anthraquinone series. Particularly preferred dyes are those which sublime in the temperature range from 160° to 220° C. and are conventionally used for transfer printing.

Specifically, the ethylene oxide adducts comprise the following types of compounds:

reaction products of saturated and/or unsaturated fatty alcohols of 10 to 20 carbon atoms with 15 to 35 moles of ethylene oxide per mole of hydroxyl group;

reaction products of saturated and/or unsaturated fatty amines of 10 to 20 carbon atoms with 7 to 18 moles of ethylene oxide per mole of amino group.

Mixtures of ethylene oxide adducts are also suitable. Such mixtures are obtained by mixing individual ethoxylates, or direct by reacting a mixture of fatty alcohols and/or fatty amines with ethylene oxide. Suitable saturated or unsaturated fatty alcohols are dodecanol, palmityl alcohol, stearyl alcohol, oleyl alcohol or tallow fatty alcohols.

Representative fatty amines are stearylamine, laurylamine, palmitylamine and oleylamine. Suitable polyvinylpyrrolidones are in particular those in which the heterocyclic radicals are substituted by branched or unbranched $C_2$–$C_6$alkyl groups.

The formulations of the invention preferably contain the nonionic dispersants in a concentration of 5 to 20% by weight, most preferably of 8 to 15% by weight, based on dye.

The following dispersants have been found to be particularly suitable: cetyl stearyl alcohol ethoxylate with a molecular weight of 1000 to 1500, laurylamine ethoxylate with a molecular weight of 500 to 800, and $C_2$–$C_6$alkylpolyvinylpyrrolidone with a molecular weight of 13,000 to 22,000.

For preparing the alkyd resin-based printing inks which are used in particular for e.g. transfer printing, those formulations have proved suitable which comprise 80 to 95% by weight of disperse dye having a sublimation point in the range from 160° to 220° C., and 20 to 5% by weight of a nonionic dispersant, and which substantially contain no further ingredients.

The novel formulations are obtained by preparing a homogeneous dispersion of the disperse dye or dyes in water by adding at least one of the nonionic dispersants referred to above, and subjecting the suspension so obtained to a grinding operation until the primary particle size is less than 5 $\mu$m. The resultant fine dispersion is then converted into a dry powdered form in a manner known per se.

The dye is ground in a conventional wet grinding unit, e.g. an agitator ball mill or a sand mill. Suitable driers are spray driers, fluid bed driers thin-layer contact driers, e.g. cylinder driers, and continuous paddle driers. It is advantageous to use a spray drier, as it affords rapidly dispersible formulations.

In the course of the drying operation, the nonionic dispersants counteract agglomeration of the dye particles and, in addition, prevent dust formation during transportation and storage of the dye powders.

The formulations of the invention are most suitable for preparing non-aqueous organic printing pastes and printing inks for textile printing, in particular for printing supports for transfer printing. Compared with known formulations which contain anionic dispersants, these formulations are distinguished by the following features:

excellent compatibility with synthetic thickeners, e.g. alkyd resins, polyacrylates, or copolymers based on vinylpyrrolidone or maleic acid;

easy dispersibility; and complete solubility of the dispersant in the organic media employed for preparing printing pastes and printing inks, e.g. alcohols.

The invention is illustrated in more detail by the following Examples, in which parts and percentages are by weight.

EXAMPLE 1

With efficient stirring, 450 parts of the dry dye of the formula

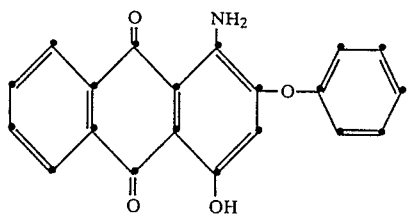

are slowly added to 45 parts of cetyl stearyl alcohol, etherified with 25 moles of ethylene oxide, and 400 parts of water and the mixture is homogenised for 1 hour and deaerated. The 50% dyestuff suspension so obtained is ground for about 15 hours in an open mill with 2000 parts of siliquartzite beads (1 mm diameter). When the wet grinding operation is complete, the particle size is less than 5 μm. The dispersion is separated from the grinding elements, which are subsequently washed with 105 parts of water.

The fine dispersion is dried in a spray drier to give a free-flowing, non-dusting dyestuff powder consisting of: 90% of dye, 9% of dispersant and 1% of residual moisture. This powder can be rapidly dispersed in alkyd resin-based organic printing media. The formulation does not lower the viscosity of synthetic thickeners.

EXAMPLES 2 TO 4

The procedure described in Example 1 is repeated, using equal parts of one of the dyes listed below. The formulations so obtained are likewise very suitable for preparing organic printing pastes and printing inks which contain synthetic thickeners.

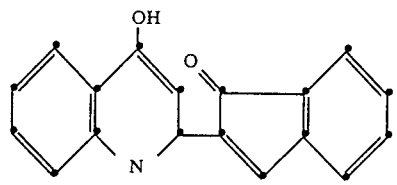

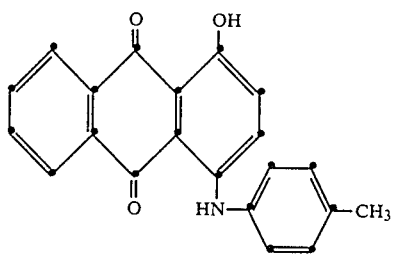

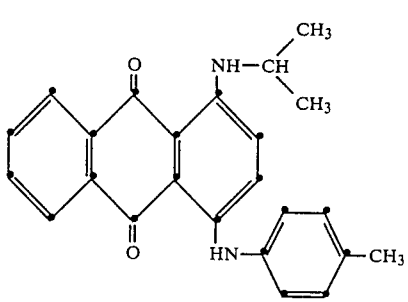

EXAMPLE 5

With efficient stirring, 450 parts of the dry dye of the formula

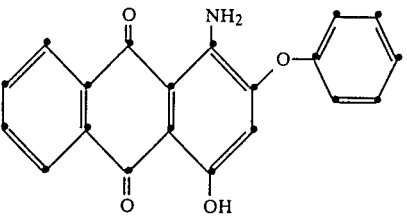

are slowly added to 45 parts of laurylamine ethoxylate (molecular weight 500 to 800) and 400 parts of water and the mixture is homogenised for 1 hour and deaerated. The 50% dyestuff suspension so obtained is ground for about 15 hours in an open mill with 2000 parts of siliquartzite beads (1 mm diameter). When the wet grinding operation is complete, the particle size is less than 5 μm. The dispersion is separated from the grinding elements, which are subsequently washed with 105 parts of water.

The fine dispersion is dried in a spray drier to give a free-flowing, non-dusting dyestuff powder consisting of: 90% of dye, 9% of dispersant and 1% of residual moisture. This powder can be rapidly dispersed in alkyd resin-based organic printing media.

EXAMPLE 6

The procedure of Example 5 is repeated, except that the nonionic dispersant employed therein is replaced by the same amount of a $C_2$–$C_6$alkylpolyvinylpyrrolidone with a molecular weight of 13,000 to 22,000. The dye formulation so obtained is very suitable for preparing organic printing pastes and printing inks which contain synthetic thickeners.

EXAMPLE 7 (PRINTING INK)

A 100 ml glass beaker is charged with 30 g of alkyd resin thickener (Grinding Base 100-S, available from Lawter Chemicals Inc.). Then 15 g of a dye formulation according to Example 1 and 3 g of desiccant paste (SIGBA) are added and the mixture is stirred for 15 minutes to bring the dye particles into homogeneous dispersion. The mixture is then dispersed in a 3-roll mill (BUEHLER 3-roll mill, type SDY 200) at 30° C. A ready for use printing ink is obtained.

EXAMPLE 8 (TRANSFER PRINTING ON PES)

The printing ink obtained in Example 7 is applied to Transferotto-I paper (smooth transfer paper; 65 g/cm$^2$) from a rubber printing roller using a test printing machine (23° C., 0.5 m/s and 590N). The add-on is 0.5 to 2.5 g/m$^2$. The printed support is dried and then polyester fabric is printed with it by transfer printing (contact time 30 seconds, temperature 210° C.). A brilliant red print with sharp contours is obtained.

What is claimed is:

1. A solid disperse dye formulation which does not contain anionic dispersants and which comprises one or more disperse dyes having a particle size of less than 5 μm, and one or more nonionic dispersants selected from the group of the fatty alcohol ethoxylates having a molecular weight in the range from 800 to 2000, of the fatty amine ethoxylates having a molecular weight in the range from 500 to 1000 and of the polyvinylpyrrolidones having a molecular weight in the range from 10,000 to 25,000.

2. A formulation according to claim 1, which contains a disperse dye of the azo or anthraquinone series which sublimes in the temperature range from 160° to 220° C.

3. A formulation according to claim 1, which contains the nonionic dispersant in a concentration of 5 to 20% by weight based on dye.

4. A formulation according to claim 1, wherein the nonionic dispersant is a cetyl-stearyl alcohol ethoxylate with a molecular weight of 1000 to 1500, a laurylamine ethoxylate with a molecular weight of 500 to 800 and/or a $C_2$–$C_6$alkylpolyvinylpyrrolidone with a molecular weight of 13,000 to 22,000.

5. A formulation according to claim 1, which consists of 80 to 95% by weight of a disperse dye which sublimes in the temperature range from 160° to 220° C., and 20 to 5% of a nonionic dispersant.

6. A process for the preparation of a formulation according to claim 1, which comprises homogeneously dispersing one or more disperse dyes in water by adding at least one nonionic dispersant of the indicated kind, grinding the dispersion to a particle size of less than 5 μm and then drying, the fine dispersion so obtained.

7. A formulation according to claim 1, which contains the nonionic dispersant in a concentration of 8 to 15% by weight based on dye.

8. A process of claim 6 wherein the fine dispersion is dried by spray drying.

9. A method of preparing an organic printing paste or printing ink which comprises the step of dispersing a solid dye formulation of claim 1 in a printing ink vehicle.

* * * * *